(12) United States Patent
Zhang

(10) Patent No.: US 9,648,682 B1
(45) Date of Patent: May 9, 2017

(54) CURRENT CONTROL CIRCUITS

(71) Applicant: PRINCETON TECHNOLOGY CORPORATION, New Taipei (TW)

(72) Inventor: Sheng-You Zhang, New Taipei (TW)

(73) Assignee: PRINCETON TECHNOLOGY CORPORATION, New Taipei (TW)

( * ) Notice: Subject to any disclaimer, the term of this patent is extended or adjusted under 35 U.S.C. 154(b) by 0 days.

(21) Appl. No.: 15/227,232

(22) Filed: Aug. 3, 2016

(30) Foreign Application Priority Data

Apr. 6, 2016 (CN) .......................... 2016 1 0209406

(51) Int. Cl.
*H05B 37/00* (2006.01)
*H05B 33/08* (2006.01)

(52) U.S. Cl.
CPC ....... *H05B 33/0815* (2013.01); *H05B 33/083* (2013.01); *H05B 33/0842* (2013.01)

(58) Field of Classification Search
CPC .............. H05B 33/0815; H05B 33/083; H05B 33/0833; H05B 33/0842
USPC ........ 315/185 R, 200 R, 201, 291, 294, 297, 315/307, 312
See application file for complete search history.

(56) References Cited

U.S. PATENT DOCUMENTS

| 8,476,836 | B2 * | 7/2013 | van de Ven | ........ | H05B 33/0809 |
| | | | | | 315/185 R |
| 2011/0062882 | A1 | 3/2011 | Kou et al. | | |
| 2012/0299489 | A1 * | 11/2012 | Sakuragi | .............. | H05B 33/083 |
| | | | | | 315/187 |
| 2013/0099683 | A1 * | 4/2013 | Sakuragi | .............. | H05B 33/083 |
| | | | | | 315/185 R |
| 2013/0169160 | A1 * | 7/2013 | Kim | ........................ | H05B 37/02 |
| | | | | | 315/122 |
| 2015/0108909 | A1 * | 4/2015 | Rupp | .................... | H05B 33/083 |
| | | | | | 315/188 |
| 2016/0007416 | A1 * | 1/2016 | Viviani | ................ | H05B 33/083 |
| | | | | | 315/200 R |
| 2016/0381750 | A1 * | 12/2016 | Bong | ................. | H05B 33/0845 |
| | | | | | 315/201 |

FOREIGN PATENT DOCUMENTS

| TW | 201304602 A | 1/2013 |
| TW | M449335 U | 3/2013 |
| TW | 201603644 A | 1/2016 |
| TW | M530004 U | 10/2016 |

* cited by examiner

*Primary Examiner* — Jason M Crawford
(74) *Attorney, Agent, or Firm* — Muncy, Geissler, Olds & Lowe, P.C.

(57) ABSTRACT

A current control circuit is provided for a driving circuit system of LEDs coupled in series. The driving circuit system includes a rectifier and current modules. In the current control circuit, a first voltage-division circuit divides an output voltage of the rectifier to obtain a first voltage. A first operational amplifier has a non-inverting input terminal receiving a reference voltage, an inverting input terminal coupled to a common output terminal, and an output terminal coupled to one terminal of a capacitor and a first input terminal of a multiplier. A first input terminal of the multiplier receives an output voltage of the first operational amplifier, and the second input terminal thereof receives the first voltage. The other terminal of the capacitor is coupled to the ground. One terminal of a resistor is coupled to the common output terminal, and the other terminal thereof is coupled to the ground.

9 Claims, 4 Drawing Sheets

CURRENT CONTROL CIRCUITS

CROSS REFERENCE TO RELATED APPLICATIONS

This application claims priority of China Patent Application No. 201610209406.X, filed on Apr. 6, 2016, the entirety of which is incorporated by reference herein.

BACKGROUND OF THE INVENTION

Field of the Invention

The invention relates to an electronic circuit, and more particularly, to a current control circuit for a driving circuitry system of light-emitting diode (LED) components.

Description of the Related Art

Generally, an LED driving circuitry system is used to rectify an AC power voltage (VAC) from an electric grid for driving an LED component. A serious problem in this manner of driving is that there is a high level of total harmonic distortion (THD) in the circuit.

FIG. 1 shows the structure of a current three-stage LED driving circuitry system. A rectifier performs full-wave rectification on an AC power to generate a voltage Vo for driving the LED component at each stage. The waveform of the voltage Vo is a sine wave. With the increase of the voltage Vo, the LED component LED1 is turned on first, and, at the same time, the transistor M1 is turned on. At this time, the voltage Vcs at the common output terminal CS tracks the reference voltage $V_{REF1}$. When the voltage Vo increases further, the LED component LED2 is turned on, and, at the same time, the transistor M2 is turned on. At this time, the voltage $V_{CS}$ at the common output terminal CS tracks the reference voltage $V_{REF2}$, and the transistor M1 is turned off. When the voltage Vo continuously increases to a higher level, the LED component LED3 is turned on, and, at the same time, the transistor M3 is turned on. At this time, the voltage $V_{CS}$ at the common output terminal CS tracks the reference voltage $V_{REF3}$, and the transistors M1 and M3 are turned off. In cases where the voltage Vo decreases, the above process is performed inversely.

In the circuit, the current $I_{Vo}$ flowing through the LED component(s) is equal to the current $I_{CS}$ flowing through the common resistor $R_{CS}$, represented by Equation (1):

$$I_{CS}=I_{Vo}=V_{CS}/R_{CS} \quad \text{Equation (1)}$$

$V_{CS}$ represents the voltage at the common output terminal CS. $R_{CS}$ represents the resistance value of the resistor $R_{CS}$. $V_{CS}$ tracks the reference voltage $V_{REF1}$, $V_{REF2}$, or $V_{REF3}$ when the transistor M1, M2, or M3 is turned on, respectively. The reference voltage $V_{REF1}$, $V_{REF2}$, and $V_{REF3}$ are three basis voltages. The relationship between the reference voltages $V_{REF1}$, $V_{REF2}$, and $V_{REF3}$ is $V_{REF1}<V_{REF2}<V_{REF3}$. Thus, Equation (2) is obtained:

$$I_{CS}=I_{Vo}=V_{REF}/R_{CS} \quad \text{Equation(2)}$$

$V_{REF}$ is equal to the basis voltage $V_{REF1}$, $V_{REF2}$, or $V_{REF3}$ with the variation of the turned-on states of the LED components at the respective stages.

Thus, with the increase of the voltage Vo, the waveform of the current $I_{CS}$ flowing through the common resistor $R_{CS}$ varies by a step phase. The current $I_{CS}$ is equal to $V_{REF1}/R_{CS}$, $V_{REF2}/R_{CS}$, or $V_{REF3}/R_{CS}$.

FIG. 2 is a is a schematic view showing the key voltages and currents of the three-stage LED driving circuitry system of FIG. 1. Since there is serious variation in the steps of the current Ics ($I_{Vo}$), the linearity of the circuitry system is low, and the THD is high. Currently, in order to enhance the linearity and lower the THD to approximately fit the envelope of the current $I_{CS}$ to the sine wave of the full-wave rectification (that is, being similar to the waveform of the voltage Vo), the number of stages of LED components has to increase, and the number of operational amplifier and transistors also has to increase, thereby increasing the number of steps of the current $I_{CS}$ and decreasing the amplitude of the steps. However, when the above manner is applied, the size of the driving circuitry system increases, and the cost of the driving circuitry system also increases seriously.

BRIEF SUMMARY OF THE INVENTION

Thus, the present invention provides a current control circuit for a driving circuitry system of a light-emitting diode (LED) component, which is capable of effectively decreasing the total harmonic distortion (THD) in the circuit, however, without an increase of the circuit size.

An exemplary embodiment of a current control circuit is provided. The current control circuit is applied for a driving circuitry system of a multi-stage light-emitting diode (LED) components coupled in series. The driving circuitry system comprises a rectifier 301 and current modules 313. The rectifier performs full-wave rectification on an AC input to provide an output voltage to power the LED components. An input terminal of each current modules is coupled to a cathode of the corresponding LED component to set a current flowing through the corresponding LED component. Output terminals of the current modules are coupled together to form a common output terminal CS. The current control circuit comprises a first voltage-division circuit, a first operational amplifier OP1, a multiplier 302, a capacitor $C_{COMP}$, and a resistor $R_{CS}$. The first voltage-division circuit divides the output voltage of the rectifier to obtain a first voltage $V_{MULT}$. The first operational amplifier OP1 has a non-inverting input terminal receiving a reference voltage $V_{REF}$, an inverting input terminal coupled to the common output terminal CS, and an output terminal coupled to one terminal of the capacitor and a first input terminal of the multiplier 302. The multiplier 302 has the first input terminal receiving an output voltage $V_{COMP}$ of the first operational amplifier, a second input terminal receiving the first voltage $V_{MULT}$, and an output terminal providing a basis voltage for each of the current modules. The capacitor $C_{COMP}$ has the one terminal coupled to the output terminal of the first operational amplifier, and the other terminal coupled to a ground. The resistor has one terminal coupled to the common output terminal and the other terminal coupled to the ground.

In an exemplary embodiment, the first voltage-division circuit comprises a resistor $R_{MULT1}$ (first resistor) and a resistor $R_{MULT2}$ (second resistor). The resistor $R_{MULT1}$ and the resistor $R_{MULT2}$ are coupled in series to divide the output voltage of the rectifier 301. A voltage at a joint node between the resistor $R_{MULT1}$ and the resistor $R_{MULT2}$ is the voltage $V_{MULT}$ (first voltage).

In another exemplary embodiment, the current control circuit further comprises a second voltage-division circuit. The second voltage-division circuit comprises a buffer, a voltage-division resistor network, and a constant current source. The buffer buffers an output-terminal voltage of the multiplier. The voltage-division resistor network comprises a plurality of resistors (R1, R2, R3) coupled in series. The voltage-division resistor network divides a buffered voltage from the buffer for providing basis voltages for the corresponding current modules. The constant current source provides a constant current for the voltage-division resistor network.

In another exemplary embodiment, the buffer comprises a second operational amplifier OP2 and a first transistor M1. The second operational amplifier OP2 has an inverting input terminal coupled to the output terminal of the multiplier, a non-inverting input terminal coupled to a drain of the first transistor M1, and an output terminal coupled to a gate of the first transistor. The first transistor M1 has a source coupled to the ground.

In another exemplary embodiment, the output-terminal voltage of the multiplier is directly proportional to the output voltage of the rectifier.

In another exemplary embodiment, the waveform of the current flowing through the LED components approximates a sine wave of full-wave rectification.

In another exemplary embodiment, an average current flowing through the LED components is defined as:

$$I_{AVG}=V_{REF} \times R_{CS}$$

$I_{AVG}$ is the average current, $V_{REF}$ represents a voltage at the non-inverting input terminal of the first operational amplifier, and $R_{CS}$ represents a resistance value of the resistor.

In another exemplary embodiment, each of the current control circuits comprises a third operational amplifier and a second transistor. The third operational amplifier has a non-inverting input terminal receiving the corresponding basis voltage provided by the second voltage-division circuit, an inverting input terminal coupled to the output terminal of the current module, and an output terminal coupled a gate of a second transistor. The second transistor has a drain coupled to the input terminal of the current module, and a source coupled to the output terminal of the current module.

In another exemplary embodiment, among the basis voltages provided by the second voltage-division circuit, the difference between two adjacent basis voltages is larger than the sum of the maximum offset voltages of the operational amplifiers of the current modules receiving the two adjacent basis voltages.

The current control circuit in each of the above embodiments is capable of adjusting the waveform of the current flowing through the LED components so that it approximates the sine wave of the full-wave rectification, which effectively solves the problem of the current steps. Thus, the THD in the circuit decreases effectively, however, without any increase of the circuit size.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
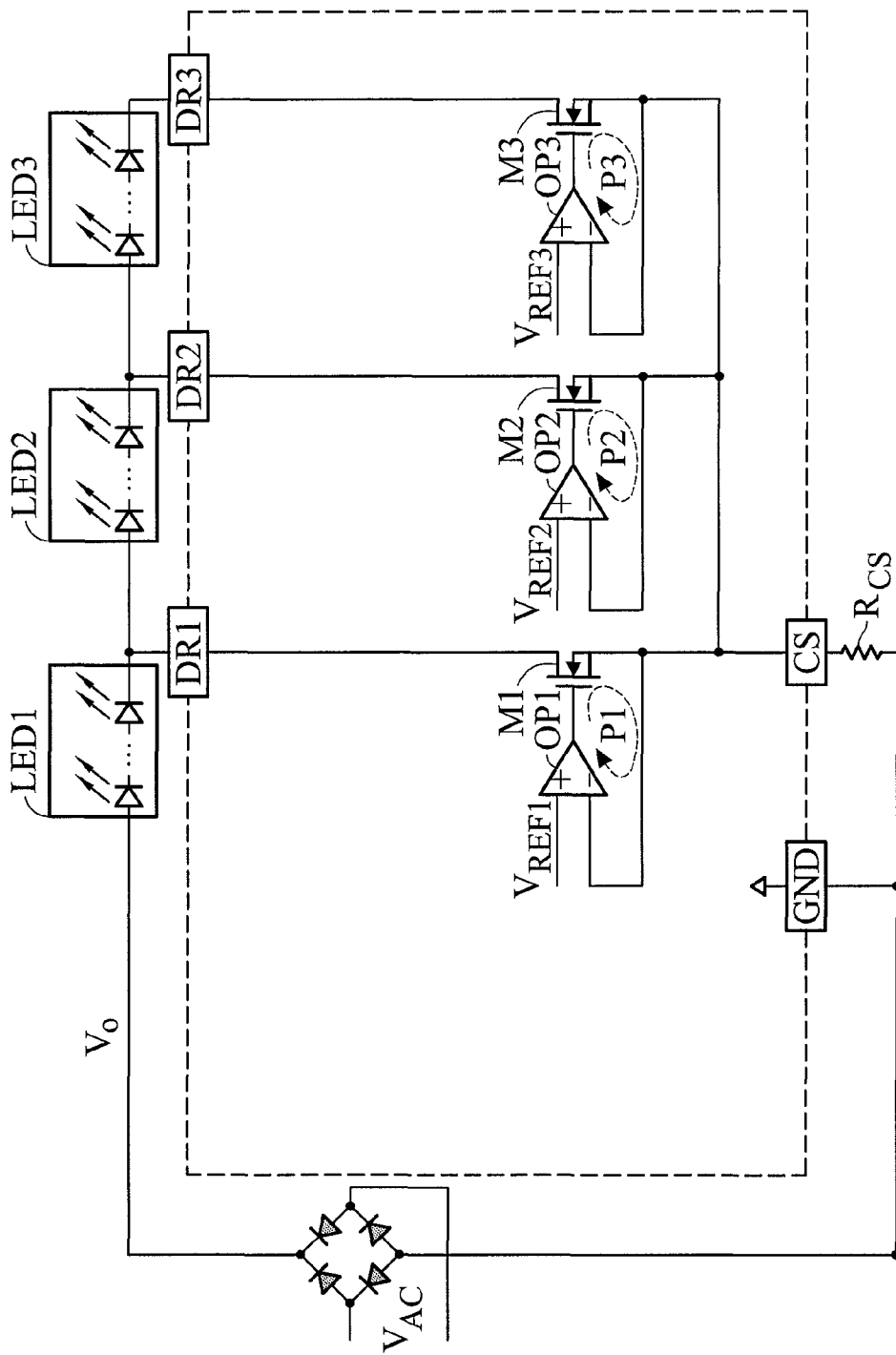
FIG. 1 shows a structure of a current three-stage LED driving circuitry system.

To better understand the technical aspects of the present invention, the following embodiments of the invention will be described in detail by referring to the drawings.

Various exemplary embodiments of the present invention, features and aspects will be described with reference to the accompanying drawings. The elements with identical or similar functions are designated by the same reference numerals. Although the drawings illustrate various aspects of the embodiments, the drawings are not necessarily drawn to scale unless otherwise indicated.

Here a dedicated word "exemplary" means "serving as an example, embodiment, or illustration." Any "exemplary" embodiment herein does not have to be interpreted as being better than other embodiments.

In addition, in order to better illustrate the present invention, the following detailed description, numerous specific details are given. Those skilled in the art will understand that without some specific details, the invention may be practiced. In other embodiments, well known methods, tools, components and circuits have not been described in detail in order to highlight the spirit of the invention.

Figure 3:
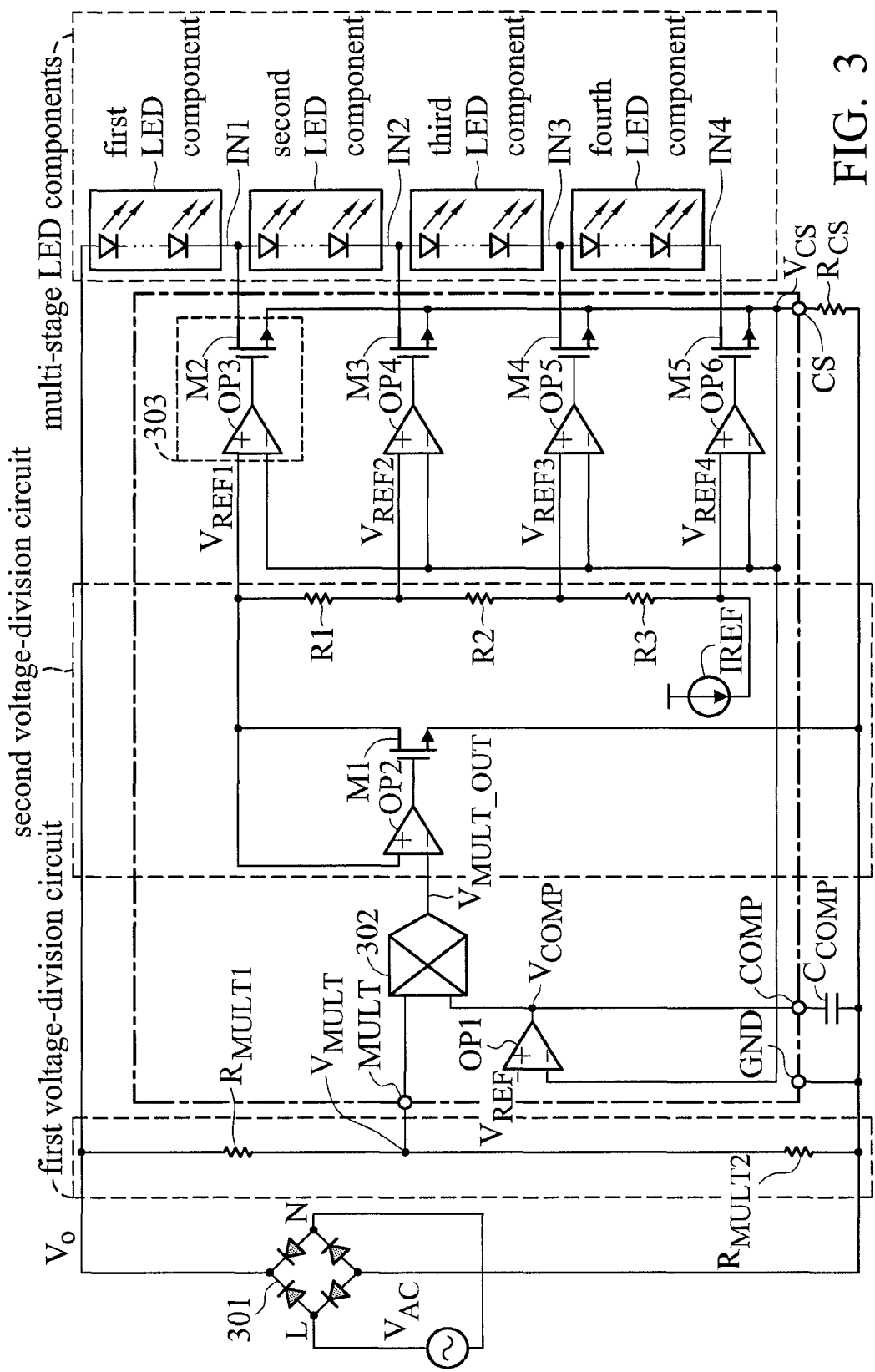
FIG. 3 shows an exemplary embodiment of a current control circuit.

FIG. 3 shows an exemplary embodiment of a current control circuit. The current control circuit is applied for a driving circuitry system of light-emitting diode (LED) components. FIG. 3 shows a current control circuit for four-stage LED components. One skilled in the art will understand that the current control circuit disclosed by the embodiment can also be applied to the driving circuit of LED components.

As shown in FIG. 3, the driving circuitry system comprises a rectifier 301 and current modules 303. The rectifier 301 rectifies an input AC voltage to obtain an output voltage Vo and powers the multi-stage light-emitting diode (LED) components by the output voltage Vo. The input terminals IN1, IN2, IN3, and IN4 of the current modules 303 are coupled to the cathodes of the corresponding LED components to set the currents flowing through the LED components, respectively. The output terminals of the current modules are coupled together to form a common output terminal CS.

Figure 2:
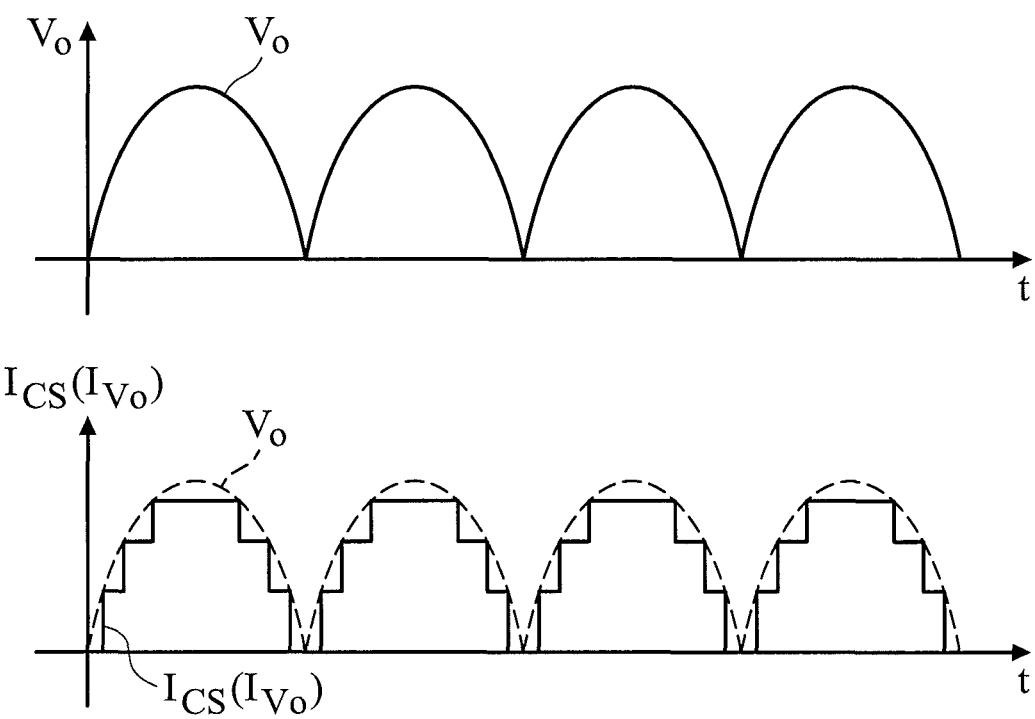
FIG. 2 is a is a schematic view showing the key voltages and currents of the three-stage LED driving circuitry system of FIG. 1.

In an embodiment, the structure of each current module 303 is similar to the structure shown in FIG. 2. Each current module 303 is composed of an operational amplifier (such a third operational amplifier OP3) and a transistor (such as a transistor M2). The non-inverting input terminal of the operational amplifier receives a basis voltage provided by a second voltage-division circuit, the inverting input terminal thereof is coupled to the common output terminal CS, and the output terminal thereof is coupled to the gate of the transistor M2. The drain of the transistor M2 is coupled to the input terminal of the current module (that is, being coupled to the cathode of the corresponding LED component), and the source thereof is coupled to the common output terminal CS. The transistor M2 is implemented by, for example, an MOS transistor. In the embodiment of FIG. 3, the transistor M2 is implemented by an N-type MOS transistor. Those skilled in the art should understand that the transistor M2 may be implemented by other types of transistors to achieve a similar switching operation. The specific structure of the current module 303 can be determined according to actual requirements, without limitation to the present invention.

As shown in FIG. 3, the current control circuit of the embodiment comprises a first voltage-division circuit, an operational amplifier OP1 (first operational amplifier), a multiplexer 302, a capacitor $C_{COMP}$, and a resistor $R_{CS}$. The first voltage-division circuit divides the output voltage Vo of the rectifier to obtain a first voltage $V_{MULT}$. The non-inverting input terminal of the first operational amplifier receives the reference $V_{REF}$, the inverting input terminal thereof is coupled to the common output terminal CS, and the output terminal thereof is coupled to one terminal of the capacitor $C_{COMP}$ and the first input terminal of the multiplier 302. The first input terminal of the multiplier 302 receives the output voltage $V_{COMP}$ of the operational amplifier OP1, the second input terminal thereof receives the voltage $V_{MULT}$, and the output terminal thereof generates a voltage used for providing basis voltages for the current modules. One terminal of the capacitor $C_{COMP}$ is coupled to the output terminal of the operational amplifier OP1, and the other terminal thereof is coupled to the ground. One terminal of the resistor $R_{CS}$ is coupled to the common output terminal CS, and the other terminal thereof is coupled to the ground.

In an embodiment, the first voltage-division circuit has a structure which is similar to that shown in FIG. 3. Referring to FIG. 3, the first voltage-division circuit comprises a resistor $R_{MULT1}$ (first resistor) and a resistor $R_{MULT2}$ (second resistor). The resistor $R_{MULT1}$ and the resistor $R_{MULT2}$ are coupled in series to divide the output voltage of the rectifier. The voltage at the joint node between the resistor $R_{MULT1}$ and the resistor $R_{MULT2}$ is the voltage $V_{MULT}$ (first voltage). Those skilled in the art will understand that the first voltage-division circuit may be implemented by other various structures according to actual requirements, without limitation to the present invention.

In an embodiment, the output terminal of the multiplier can generate the voltage used for providing the basis voltages for the current modules by various manners. For example, the second voltage-division circuit shown in FIG. 3 can be used for providing the basis voltages for the current modules. As shown in FIG. 3, the second voltage-division circuit comprises a buffer, a voltage-division resistor network, and a constant current source. The buffer comprises an operational amplifier OP2 (second operational amplifier) and a transistor M1 (first transistor). The inverting input terminal of the operational amplifier OP2 is coupled to the output terminal of the multiplier 302, the non-inverting input terminal thereof is coupled to the drain of the transistor M1, and the output terminal thereof is coupled to the gate of the transistor M1. The source of the transistor M1 is coupled to the ground. The voltage-division resistor network is composed of resistors R1, R2, and R3 which are coupled in series. The resistor R1 is coupled to the drain of the transistor M1. The resistor R3 is coupled to the constant current source IREF. The voltages $V_{REF1}$, $V_{REF2}$, and $V_{REF3}$ at the voltage-division nodes of the voltage-division resistor network are provided as the basis voltages of the current modules, respectively. The constant current source IREF provides a constant current for the voltage-division resistor network. Those skilled in the art should understand that the second voltage-division circuit may be implemented by other various structures according to actual requirements, without limitation to the present invention.

Note that the dotted lines in FIG. 3 showing the circuitry structure represent exemplary current packages. The elements disposed on the inside of the block drawn by the dotted lines are circuit elements which are integrated into one single chip. The terminals VIN, IS, GND, and COMP on the dotted lines are the pins of the chip. One skilled in the art will understand that the package shown in FIG. 3 is an exemplary embodiment. The chip package can be implemented according to actual requirements, without limitation to the present invention. For example, the capacitor $C_{COMP}$ and the resistor $R_{CS}$ can be integrated into the same chip with the operation amplifier OP1.

Figure 4:
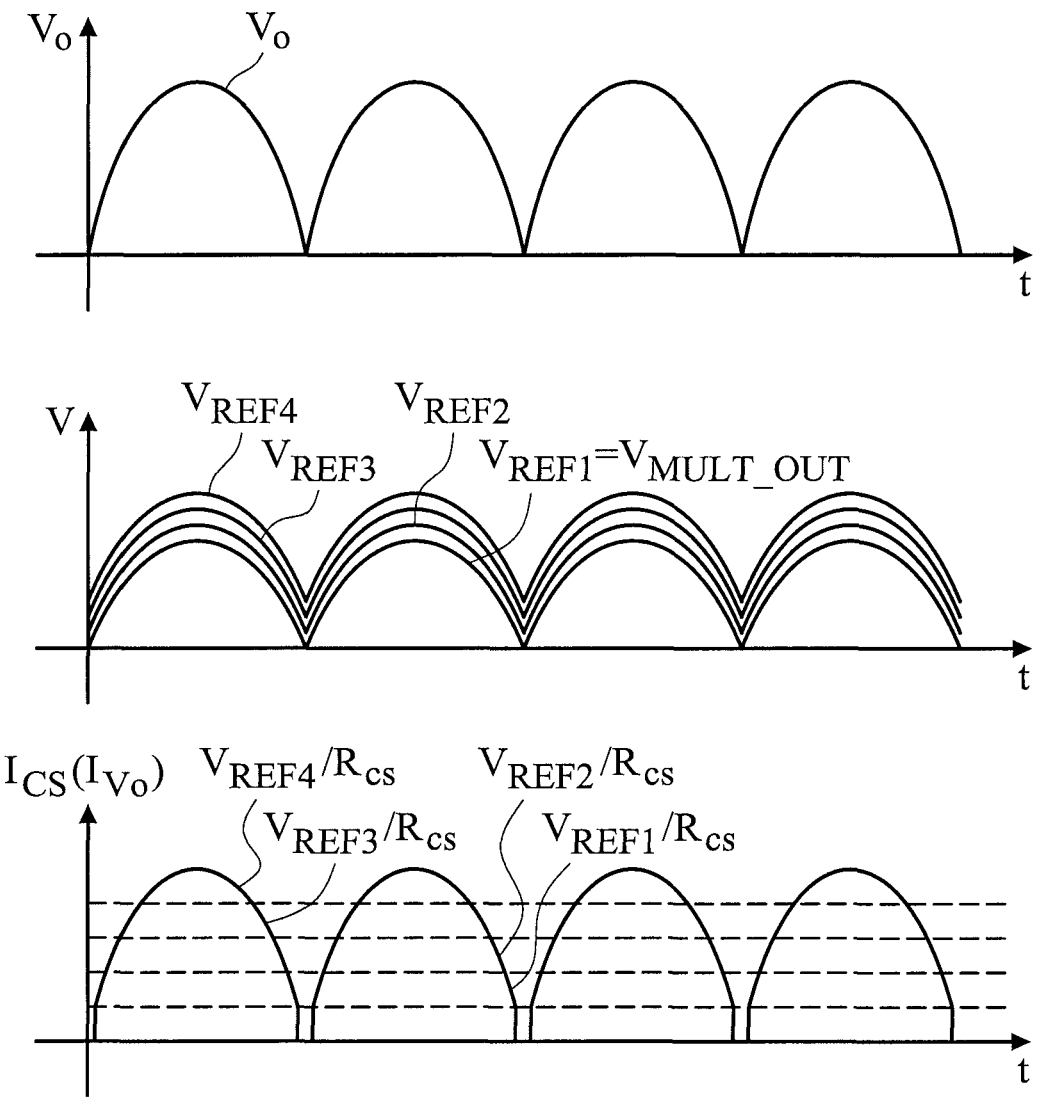
FIG. 4 is a schematic view showing key voltages and currents of the current control circuit of FIG. 3.

FIG. 4 is a schematic view showing the key voltages and currents of the current control circuit. The operation of the current control circuit will be described by referring to the embodiment of FIG. 3 and the timing charts of FIG. 4.

As shown in FIG. 3, the rectifier 301 performs the full-wave rectification on the AC voltage $V_{AC}$ from the electric grid to generate the output voltage Vo. The output voltage Vo is provided to the LED components to power the circuits herein. The resistor $R_{MULT1}$ and the resistor $R_{MULT2}$ work together to divide the voltage Vo and generate the voltage $V_{MULT}$. One input terminal of the multiplier 302 receives the voltage $V_{MULT}$. The resistor $R_{CS}$ converts the current flowing through the LED component(s) to the voltage $V_{CS}$. The voltage $V_{CS}$ at the common output terminal CS is fed back to the inverting input terminal of the operational amplifier OP1. A comparison and integration operation is performed on the voltage $V_{CS}$ and the reference voltage $V_{REF}$ by the operational amplifier OP1. The output terminal of the operational amplifier OP1 is coupled to the capacitor $C_{COMP}$ to obtain the voltage $V_{COMP}$ to serve as the input voltage for the other input terminal of the multiplier 302. The output-terminal voltage $V_{MULT\_OUT}$ of the multiplier 302 is divided by the second voltage-division circuit to obtain four basis voltages $V_{REF1}$, $V_{REF2}$, $V_{REF3}$, and $V_{REF4}$ for four current modules. The above elements and components form a current control loop.

As shown in FIG. 3, in each period of the AC power voltage $V_{AC}$, the voltage $V_{MULT}$ which is obtained at the pin MULT through the first voltage-division circuit is directly proportional to the voltage Vo. The output-terminal voltage $V_{MULTI\_OUT}$ which is obtained by multiplying the voltage $V_{MULT}$ with the voltage $V_{COMP}$ of the capacitor $C_{COMP}$ through the multiplier 302 is directly proportional to the voltage Vo. The operational amplifier OP2, the transistor M1, the resistors R1-R3, and the constant current source operate to perform the buffering and voltage-division operation on the output-terminal voltage $V_{MULT\_OUT}$, so that $V_{REF1}=V_{MULT\_OUT}$, $V_{REF2}=V_{REF1}+IREF*R1$, $V_{REF3}=V_{REF2}+IREF*R2$, and $V_{REF4}=V_{REF3}+IREF*R3$, wherein R1=R2=R3=R, the current IREF is a current of the constant current source as being a constant. Thus, the relationship between the voltages $V_{REF1}$, $V_{REF2}$, $V_{REF3}$, and $V_{REF4}$ is $V_{REF1}<V_{REF2}<V_{REF3}<V_{REF4}$. Each of the voltages $V_{REF1}$, $V_{REF2}$, $V_{REF3}$, and $V_{REF4}$ is directly proportional to the voltage $V_{MULT\_OUT}$ and further to the voltage Vo. According to Equation (2), the current $I_{CS}$ is equal to the current $I_{Vo}$, and the two currents are directly proportional to the voltages $V_{REF1}$, $V_{REF2}$, $V_{REF3}$, or $V_{REF4}$ and further to the voltage Vo. Thus, the current-waveform of the current $I_{CS}$ tracks the voltage-waveform of the voltage Vo.

When the voltage Vo is less and not large enough to turn on the first LED component, all of the transistors M2, M3, M4, and M5 in the respective current module are turned off. However, since the voltage Vo is less than the turned-on voltage, there is no current following through the four transistors. When the first LED component is turned on with the increase of the voltage Vo, the transistor M2 and the first LED component form a current path, and the voltage $V_{CS}$ tracks the voltage $V_{REF1}$. When the voltage Vo increases further and the second LED component is turned on, the transistor M3, the first LED component, and the second LED component form another current path, and the voltage $V_{CS}$ tracks the voltage $V_{REF2}$. At this time, since the voltage $V_{REF2}$ is higher than $V_{REF1}$ ($V_{REF2}>V_{REF1}$), the transistor M2 is turned off. When the voltage Vo increases continuously and the third LED component is turned on, the transistor M4, the first LED component, the second LED component, and the third LED component form another current path, and the voltage Vcs tracks the voltage $V_{REF3}$. At this time, since the voltage $V_{REF3}$ is larger than $V_{REF2}$ ($V_{REF3}>V_{REF2}$), the transistor M3 is turned off. When the voltage Vo increases to a high level continuously and the fourth LED component is turned on, the transistor M5, the first LED component, the second LED component, the third LED component, and fourth form another current path, and the voltage Vcs tracks the voltage $V_{REF4}$. At this time, since the voltage $V_{REF4}$ is higher than $V_{REF3}$ ($V_{REF4}>V_{REF3}$), the transistor M4 is turned off. In cases where the voltage Vo decreases, the above process is performed inversely.

FIG. 4 shows the waveforms is of the voltage Vo, $V_{REF1}$, $V_{REF2}$, $V_{REF3}$, $V_{REF4}$, and $V_{MULT-OUT}$ and the waveforms of the currents $I_{CS}$ and $I_{Vo}$. As shown in FIG. 4, since the voltage Vo tracks the voltages $V_{REF1}$, $V_{REF2}$, $V_{REF3}$, and $V_{REF4}$ and the voltages $V_{REF1}$, $V_{REF2}$, $V_{REF3}$, and $V_{REF4}$ are directly proportional to the voltage Vo, the waveform of the current $I_{CS}$ (that is the current $I_{Vo}$) approximates a sine wave of the full-wave rectification. In other words, the current $I_{CS}$ tracks the voltage Vo, so that the current steps shown in FIG. 2 are eliminated. Thus, the current control circuit of the embodiment is applied toward decreasing total harmonic distortion (THD) in the circuitry system. In an embodiment, when the current control circuit disclosed in the invention is applied, the THD for the $40^{th}$ harmonic of the whole circuitry system is lower than 10%.

For the long term in the time dimension (for example, including more than 1000 periods of the AC voltage), the current control circuit of the embodiment can keep the average current $ILED_{AVG}$ of the LED components as a constant shown in Equation (3):

$$ILED_{AVG}=V_{REF} \times R_{CS}$$    Equation (3)

In an embodiment where the offset voltages of the operational amplifiers are considered, among the basis voltages provided by the second voltage-division circuit, the difference between two adjacent basis voltages (such as the voltage difference between the voltages $V_{REF2}$ and $V_{REF1}$) is larger than the sum of the maximum offset voltages of the operational amplifiers of the current modules receiving the two adjacent basis voltages (such as the operational amplifier OP3 and the operational amplifier OP4).

As shown in FIG. 4, at the moment of switching the turned-on or turned-off state of the LED components, there is a slight current change on the waveform of the current $I_{CS}$. The current change is $IREF*R/R_{CS}$. Theoretically, when the step of the current change is smaller, the THD of the circuitry system is less. However, in cases where the offset voltages of the operational amplifiers are considered, the result of IREF*R cannot be le infinitely ss, and it must ensure that the voltage (IREF*R) is higher than the sum of the maximum offset voltages of the two operational amplifiers of any two current modules. For example, the voltage (IREF*R) is higher than the sum of the maximum offset voltages of the operational amplifiers OP3 and OP4. Accordingly, it ensures that when the transistor M3 is turned on, the voltage $V_{CS}$ tracks the voltage $V_{REF2}$, and the transistor M2 is turned off normally, which results in the successful switching of the transistors.

According to the description, the current control circuit in each embodiment is capable of adjusting the waveform of the current flowing through the LED components so that it approximates the sine wave of the full-wave rectification, which effectively solve the problem of the current steps. Thus, the THD in the circuit decreases effectively, however, without an increase of the circuit size.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A current control circuit for a driving circuitry system of multi-stage light-emitting diode (LED) components coupled in series, the driving circuitry system comprising a rectifier and current modules, the rectifier performing full-wave rectification on an AC input to provide an output voltage to power the LED components, an input terminal of each current module being coupled to a cathode of the corresponding LED component to set a current flowing through the corresponding LED component, output terminals of the current modules being coupled together to form a common output terminal, and the current control circuit comprising:
   a first voltage-division circuit dividing the output voltage of the rectifier to obtain a first voltage;
   a first operational amplifier having a non-inverting input terminal receiving a reference voltage, an inverting input terminal coupled to the common output terminal, and an output terminal coupled to one terminal of a capacitor and a first input terminal of a multiplier;
   the multiplier having the first input terminal receiving an output voltage of the first operational amplifier, a second input terminal receiving the first voltage, and an output terminal providing a basis voltage for each of the current modules;
   the capacitor having the one terminal coupled to the output terminal of the first operational amplifier, and the other terminal coupled to a ground; and
   a resistor having one terminal coupled to the common output terminal and the other terminal coupled to the ground.

2. The current control circuit as claimed in claim 1, wherein the first voltage-division circuit comprises:
   a first resistor; and
   a second resistor, wherein the first resistor and the second resistor are coupled in series to divide the output voltage of the rectifier, and a voltage at a joint node between the first resistor and the second resistor is the first voltage.

3. The current control circuit as claimed in claim 1 further comprising a second voltage-division circuit comprising:
   a buffer buffering an output-terminal voltage of the multiplier;
   a voltage-division resistor network comprising a plurality of resistors coupled in series, wherein the voltage-division resistor network divides a buffered voltage from the buffer for providing basis voltages for the corresponding current modules; and
   a constant current source providing a constant current for the voltage-division resistor network.

4. The current control circuit as claimed in claim 3, wherein each of the current modules comprises:
   a third operational amplifier having a non-inverting input terminal receiving the corresponding basis voltage provided by the second voltage-division circuit, an inverting input terminal coupled to the output terminal of the current module, and an output terminal coupled a gate of a second transistor; and the second transistor having a drain coupled to the input terminal of the current module, and a source coupled to the output terminal of the current module.

5. The current control circuit as claimed in claim 4, wherein among the basis voltages provided by the second voltage-division circuit, difference between two adjacent basis voltages is larger than a sum of maximum offset voltages of the operational amplifiers of the current modules receiving the two adjacent basis voltages.

6. The current control circuit as claimed in claim 3, wherein the buffer comprises:

a second operational amplifier having an inverting input terminal coupled to the output terminal of the multiplier, a non-inverting input terminal coupled to a drain of a first transistor, and an output terminal coupled to a gate of the first transistor; and the first transistor having a source coupled to the ground.

7. The current control circuit as claimed in claim 1, wherein an output-terminal voltage of the multiplier is directly proportional to the output voltage of the rectifier.

8. The current control circuit as claimed in claim 1, wherein a waveform of the current flowing through the LED components approximates a sine wave of full-wave rectification.

9. The current control circuit as claimed in claim 1, wherein an average current flowing through the LED components is defined as:

$$I_{AVG} = V_{REF} \times R_{CS}$$

wherein $I_{AVG}$ is the average current, $V_{REF}$ represents a voltage at the non-inverting input terminal of the first operational amplifier, and $R_{CS}$ represents a resistance value of the resistor.

\* \* \* \* \*